United States Patent Office 3,074,972
Patented Jan. 22, 1963

3,074,972
PHENOL-FURYL, ALKYLENE KETONE CONDENSATION PRODUCT
Mortimer T. Harvey, South Orange, and Peter L. Rosamilia, Newark, N.J., assignors to Harvel Research Corporation, Newark, N.J., a corporation of New Jersey
No Drawing. Filed Dec. 1, 1960, Ser. No. 72,850
3 Claims. (Cl. 260—347.8)

This invention relates to novel compositions of matter and to methods for preparing them and also to articles of manufacture in which they may be employed as components. More particularly the invention is directed to novel compositions of matter produced by heat reacting in the presence of an acidic condensing agent, one or a mixture of two or more (I) phenols with one or a combination of two or more (II) partially hydrogenated furfural-ketone organic reaction products.

The class of phenols employed as reactants (I) in the practice of this invention are those in which each has the following characteristics: it is mono or poly nuclear, it is monohydric or polyhydric, it is capable of being reacted with formaldehyde in the presence of a catalyst, it is unsubstituted or substituted and if substituted, it has one or more substituents on its nucleus or nucleii and substituents are either saturated hydrocarbon radicals of 1-15 carbon atoms and/or unsaturated hydrocarbon radicals of 3-15 carbon atoms, with said unsaturation being due solely to ethylenic linkage therein, that is one or more ethylenic linkages therein. Examples of (I) are hydroxy benzene, anthranol, xylenol, and their homologues examples of which are cresols, resorcinol, ethyl phenol, isopropyl phenol, allyl phenol, tertiary amyl phenol, tertiary butyl phenol, ditertiary butyl phenol, catechol, etc., and anacardic phenols which may be monomeric as well as polymeric cashew nut shell liquid, cardol, cardanol, and residues of cashew nut shell liquid, said residues obtained by the heat distillation of cashew nut shell liquid at atmospheric or reduced pressure conditions or by steam distillation until the quantity of said residue measures no less than 50% of said cashew nut shell liquid, and also hydrogenated cashew nut shell liquid, hydrogenated cardol, hydrogenated cardanol and hydrogenated residues of cashew nut shell liquid, said hydrogenated products having only the unsaturated side chains thereof normally present therein either partially or completely saturated with hydrogen, and also bis-phenols such as those produced by reacting hydroxy benzene, antheranol, xylenol, or their homologues with cashew nut shell liquid, cardol, cardanol or said residues or with ketones such as acetone, methyl ethyl ketone, etc. in the presence of an acidic catalyst.

When cashew nut shell liquid is employed, it may be either the raw cashew nut shell liquid of commerce or it may be raw cashew nut shell liquid which has been treated for the removal of nitrogeneous and mineral components normally present therein and known as treated cashew nut shell liquid. Various methods for producing treated cashew nut shell liquids are disclosed in U.S. Patent No. 2,128,247 of August 30, 1938 and 2,067,919 of January 19, 1937 to M. T. Harvey and the patent to S. Caplan 2,559,593 of July 10, 1951. The methods for producing the various other anacardic phenols as well as the polymers thereof and the hydrogenated derivatives thereof are also well known to the art.

The reactants (II) partially hydrogenated furfural-ketone reaction products employed as reactants in the practice of this invention are the mono-and di-furfural ketones and mixtures thereof which are substantially hydrogenated to saturate with hydrogen at most all except one of carbon to carbon double bonds therein and at least that entire portion thereof outside of the rings thereof.

Monofurfural-ketones as well as difurfural-ketones, also known to the art respectively as monofurfurylidene-ketones and difurfurylidene-ketones, are well known to the art and respectively may be represented by the following structural formulas:

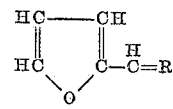

in which R is a ketone lacking two of the hydrogen atoms otherwise present on an alpha carbon thereof; and

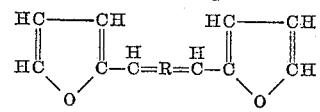

in which R is a ketone lacking two of the hydrogen atoms otherwise present on each of two of the alpha carbons thereof.

One of the methods disclosed in U.S. Patent 2,600,403, well known to the art and which may be employed to produce said materials (A) is first to react under alkaline conditions 1 mole of a ketone having at least two hydrogen atoms on an alpha carbon with 1-2 moles of furfural thereby to produce mono-and difurfural-ketones whose general formulas are described in lines 2-17 of col. 2 of U.S. Patent 2,600,403 of June 17, 1952; then the mono- or di-furfural-ketones either alone or in admixture with each other in and all proportions may be partially hydrogenated to the degree heretofore set forth by employing the methods of hydrogenation described in said U.S. Patent 2,600,403 as well as 2,600,493 and 2,738,338 and other U.S. Patent well known to the art.

Among those ketones, which are preferably employed as reactants in the production of said mono-and di-furfural-ketones are those having at least two hydrogen atoms on an alpha carbon thereof, examples, of those preferred are acetone, diacetone alcohol, methyl ethyl ketone, cyclohexanone, acetonyl acetone, mesityl oxide, phorone, isophorone, methylamyl ketone, di-isbutyl ketone, acetophenone, methylisobutyl ketone, methyl propyl ketone, methyl isopropyl ketone, etc.

According to this invention, one or a combination of two or more of said phenols (I) together with one or a combination of two or more of said materials (II) are reacted together in the presence of an inorganic strong acidic catalyst such as boron trifluoride, concentrated sulphuric acid, dry HCl, anhydrous zinc chloride, aluminum chloride, stannous chloride, or similar catalyst. In general, the reaction is preferably carried out by having materials (I) and (II) present in the reacting mixture in equal molecular proportions and the amount of boron trifluoride or other catalyst is present in catalytic proportions which may measure about 0.6-5% of the combined weights of materials (I) and (II). The reaction is preferably carried out in the presence of a solvent for the reactance and at elevated temperature to produce novel and highly useful organic reaction products.

The novel reaction products of this invention when compared with those produced by reacting a phenol with unhydrogenated furfural-ketone reaction products will be found to have greater heat stability at 300° F. and to impart greater ozone resistance to (III), hereinafter identified, and when converted to the solid state are tougher, have greater impact and tensile strengths and are more flexible and are more resistant to acids and have better electrical characteristics, such as lower power factors and higher dulectric properties.

The following are specific examples of the method which may be employed and some of the reaction products which may be produced by following the teachings of this invention. These examples are all given merely by way of illustration and not by way of limitation, all parts being given by weight unless otherwise specified.

EXAMPLE 1

35 parts of hydroxy benzene and 25 parts of monofurfurylidene-acetone which has been subjected to hydrogen so that the amount of hydrogen combined therewith measures about 33% of that required to saturate all of the normally present carbon to carbon double bonds thereof and whose general formula is $C_4H_3OC_2H_2COCH_3$, were dissolved in 100 parts of isopropyl ether in a glass reacting vessel. Then into said solution was substantially uniformly distributed 3 parts of boron trifluoride complex containing approximately .75 parts of boron trifluoride. This mass was heated and maintained at a temperature of 80–95° C. for a period of approximately 1 hour. Vacuum was applied to the vessel to provide a pressure of approximately 10 mm. of mercury and the mass was heated to drive off the solvent and any unreacted phenol and/or monofurfurylidene-acetone which might be present leaving behind a novel organic reaction product which was a dark brown viscous liquid and is hereinafter known as Product A. If desired, the resultant mass in the vessel may be heated in the temperature range of approximately 125° C.–175° C. at 10 mm. of mercury pressure and the bulk thereof is distilled over and collected, and is tan colored free flowing liquid known as product A-1.

EXAMPLE 2

95 parts of hydroxy benzene and 220 parts of difurfurylidene acetone which had been subjected to hydrogen so that the amount of hydrogen combined therewith measures 50% of that required to saturate all of the carbon to carbon double bonds therein, were dissolved in 476 parts of isopropyl ether in a glass reacting vessel. Then into said solution was substantially uniformly distributed 15 parts of boron trifluoride complex of the type used in Example 1. This mass was heated and maintained at a temperature of 80–95° C. for 1 hour. Vacuum was applied to the vessel to provide a pressure of approximately 10 mm. of mercury and the mass was heated to drive off the solvent and any unreacted phenol and/or partially hydrogenated di-furfurylidene-acetone which might be present, leaving behind a mass consisting essentially of novel organic reaction product, which was a dark brown viscous liquid, hereinafter known at product B.

EXAMPLE 3

Employing the same procedure as that set forth in Example 2 but instead of the 220 parts of partially hydrogenated difurfurylidene-acetone there is employed 200 parts of partially hydrogenated organic reaction mass produced by first reacting mesityl oxide and furfural under alkaline conditions and then subjecting said reaction product to hydrogen, in the manner set forth in the above identified U.S. patents, until the amount of hydrogen combined therewith measures approximately 50% of that required to saturate all of the carbon to carbon double bonds thereof consisting essentially of compounds and of the formulas $C_4H_3O-C_2H_4COC_4H_9$ and $C_4H_3OC_2H_4COC_6H_{10}C_4H_3O$ there was produced a dark brown viscous liquid hereinafter known as product C.

EXAMPLE 4

Employing the same procedure as that set forth in Example 2 but substituting for the partially hydrogenated difurfurylidene-acetone approximately 270 parts of partially hydrogenated organic reaction mass produced by reacting methyl ethyl ketone with furfural under alkaline conditions and thereafter treating the reaction product with hydrogen until the amount of hydrogen combined therewith measures approximately 33% of that required to saturate all of the carbon to carbon double bonds thereof and consisting essentially of the following compounds:

$C_4H_3OC_2H_4COC_2H_5$ and $C_4H_3OC_2H_4COC_3H_6C_4H_3O$

The resultant reaction product was a dark brown viscous liquid hereinafter known as product D.

EXAMPLE 5

Employing the same procedure as that set forth in Example 2, except that for the 220 parts of partially hydrogenated difurfurylidene-acetone of Example 2 there was substituted 200 parts of a partially hydrogenated difurfurylidene-acetone of the general formula $C_4H_3OC_2H_4COC_2H_4C_4H_3O$ The resultant reaction product is a dark brown heavy viscous mass and is hereinafter known as product E.

EXAMPLE 6

Employing the same procedure as that set forth in Example 2 except that in place of the partially hydrogenated difurfurylidene-acetone there is employed 175 parts of partially hydrogenated monofurfural-methyl amyl ketone of the general formula $C_4H_3OC_2H_4COC_5H_{11}$.

EXAMPLE 7

Employing the same procedure as that set forth in Example 2 except that in place of the 95 parts of hydroxy benzene, 150 parts of hydroxy benzene are employed and in place of the partially hydrogenated difurfurylidene-acetone of Example 2, about 150 parts of partially hydrogenated monofurfurylidene-acetone of the general formula $C_4H_3OC_2H_4COCH_3$ were employed. The partially hydrogenated mono-furfurylidene-acetone is mono-furfurylidene-acetone which has been subject to hydrogen until the amount of hydrogen combined therewith measured approximately 33% of that required to saturate all of the carbon to carbon double bonds therein. The resultant reaction product was a dark brown viscous liquid hereinafter known as product G.

The raw product B is subjected to distillation and the cut obtained by such distillation under 10 mm. of mercury pressure and temperature of 190–260° C. was recovered and consisted of a brown liquid consisting essentially of an organic reaction product of the hydroxy benzene and the partially hydrogenated di-furfurylidene-acetone employed and is hereinafter known as product B–1.

Raw product C was subjected to distillation under 10 mm. of mercury pressure and the distillate recovered at temperatures of 160–210° C. was a dark brown liquid and consisted essentially of the hydroxy benzene and partially hydrogenated mesityl oxide-furfural reaction product employed and is hereinafter known as product C–1.

Raw product D was subjected to heat distillation under 10 mm. of mercury pressure and a cut was taken off between 130–170° C. and was an amber colored low viscosity liquid known hereinafter as product D–1.

The raw product E was subjected to heat distillation at 10 mm. of mercury and a cut was taken off at between about 180–280° C. and was a brown liquid consisting essentially of the organic reaction product of hydroxy benzene and partially hydrogenated difurfural-acetone and is known hereinafter as product E–1.

The raw product F was subjected to heat distillation under 10 mm. of mercury pressure and a cut was taken off between about 160–260° C. and was a brown liquid consisting essentially of the organic reaction product of hydroxy benzene and partially hydrogenated monofurfural-methyl amyl ketone and is known hereinafter as product F–1.

The raw product G was subjected to heat distillation under 10 mm. of mercury pressure and a cut was taken off between about 120–180° C. and is a viscous liquid consisting essentially or the organic reaction product of hydroxy benzene and partially hydrogenated monofurfurylidene-acetone and is known hereinafter as product G-1.

It is to be understood that any of the other phenols (I) may be substituted for the hydroxy benzene in Examples 1-7 herein and that any of the other materials (II) may be reacted with the phenols (I) to provide a wide variety of novel and highly useful organic reaction products. Such reaction products, specific examples of which are the raw products A-G as well as the products A-1 to G-1, find utility in a number of different fields. They may be converted to the solid state by uniformly distributing 6 parts by weight of paratoluene sulfonic acid throughout each 100 part thereof and this mix is then permitted to stand for 3 hours in a room whose temperature is 70° F. and then placed in an oven whose temperature is 300° F. and permitted to remain therein for 12 hours and then removed therefrom and at the end of that period will be a dense solid mass substantially infusible at 350° F., and consequently they may be employed for the production of insulators and encapsulating materials for electrical components and as electrical insulating impregnants and coating compositions. They may be employed as coating materials for paper and also for woven or matted fabrics composed of glass, nylon, dacron, silk, etc. They also may be employed as insecticides and fungicides and in addition find application in the rubbery field both with natural and synthetic rubber. When employed as insecticides they may be used alone and sprayed directly onto the plants to be protected and when employed as fungicides, a wrapping material such as duck, paper or the like may be impregnated with a very small proportion of such compounds. In the rubbery field, using the customary milling and curing procedures known to the art, they may be combined with (III) natural rubber, reclaimed rubber, normally solid polymers of chloroprene, homopolymers of butadiene, copolymers of butadiene and styrene, and copolymers of butadiene and acrylonitrile. When combined with (III), it is preferable that they be added first to the material (III) after which the other materials to be normally used in the compounding are added in the customary manner, and the amount of the novel organic reaction products so combined may vary depending upon the characteristics of the end products desired, and in general may be about 1-25% by weight of material (III). The presence of these novel reaction products therein act to improve the ozone resistance and ageing of the materials (III) which in their cured condition may be employed as cable insulation, flexible hose and in the arts generally where rubber stock finds application.

It is also to be understood that the following claims are intended to cover all the generic and specific features of the invention herein described and all statements of the scope of the invention which as a matter of language might be said to fall there-between; and that they are intended to be inclusive in scope and not exclusive, in that, if desired, other materials may be added to my novel composition of matter herein claimed without departing from the spirit of the invention. Particularly, it is to be understood that in said claims, ingredients or components recited in the singular are intended to include compatible mixtures of said ingredients wherever the sense permits.

This application is a continuation-in-part of our copending application Serial No. 619,391 filed October 31, 1956 and subsequently abandoned, as a continuation-in-part of our application Serial No. 365,227 filed June 30, 1953 and subsequently abandoned.

We claim:

1. An organic reaction product produced by reacting (I) a phenol with (II) a partially hydrogenated furfural-ketone organic reaction product in the presence of an inorganic strongly acidic catalyst, said (I) capable of being reacted with formaldehyde in the presence of a catalyst, said (I) selected from the group of unsubstituted monohydric and polyhydric phenols and substituted monohydric and polyhydric phenols, with said substituents being on the nucleii thereof and being selected from the class consisting of saturated hydrocarbon radicals of 1-15 carbon atoms and unsaturated hydrocarbon radicals of 3-15 hydrocarbon atoms, with said unsaturation being due solely to ethylenic linkage, said (II) obtainable by saturating a furfural-ketone organic reaction product with a quantity of hydrogen no greater than that required to saturate at most all but one of the carbon to carbon double bonds of said furfural-ketone organic reaction product and at least as great as that required to saturate all of the carbon to carbon double bonds thereof outside of the ring structure thereof said furfural-ketone organic reaction product selected from the group consisting of (a) monofurfurylidene-ketones and (b) difurfurylidene-ketones, said (a) and (b) produced by reacting under alkaline conditions furfural with a ketone selected from the group consisting of acetone, diacetone alcohol, methyl ethyl ketone, cyclohexanone, acetonyl acetone, mesityl oxide, phorone, isophorone, methyl amyl ketone, di-isobutyl ketone, acetophenone, methyl isobutyl ketone, methyl propyl ketone, and methyl isopropyl ketone.

2. An organic reaction product defined in claim 1, with (I) being hydroxybenzene and (II) being a compound of the formula

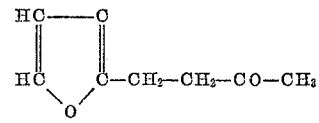

3. An organic reaction product defined in claim 1, with (I) being hydroxybenzene and (II) being a compound of the formula

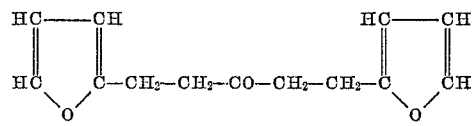

References Cited in the file of this patent

UNITED STATES PATENTS 2,561,814     Novotny _____ July 24, 1951